H. C. & D. C. MARKHAM.
Mowing-Machine.

No. 161,533.　　　　　　　　　　　Patented March 30, 1875.

Witnesses:
Thomas E. Williams
Fred Upright

Inventors:
Homer C. Markham
D. Clinton Markham

UNITED STATES PATENT OFFICE.

HOMER C. MARKHAM AND D. CLINTON MARKHAM, OF LYON'S FALLS, N. Y.

IMPROVEMENT IN MOWING-MACHINES.

Specification forming part of Letters Patent No. 161,533, dated March 30, 1875; application filed December 22, 1874.

*To all whom it may concern:*

Be it known that we, HOMER C. MARKHAM and D. CLINTON MARKHAM, of Lyon's Falls, Lewis county, New York, have invented a novel Rock-Shaft, as a portion of a direct-draft mowing-machine, of which the following is a specification:

The object to be attained by our invention is to give smoothness and ease to the motion of the knife-bar, said motion being conveyed from the vibrating pitman of such machine to the knife-bar, through the intervention of a peculiarly-constructed rock-shaft, which is herewith described, reference being had to the accompanying drawings, in which—

Figure 1:
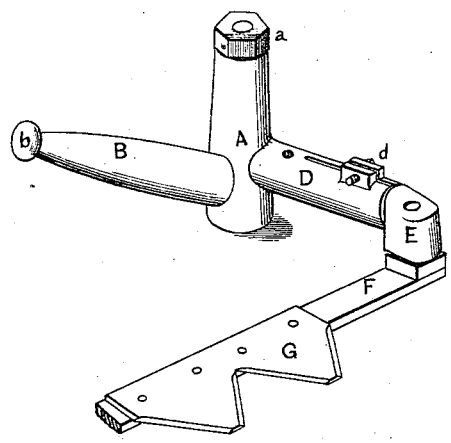
Figure 2:
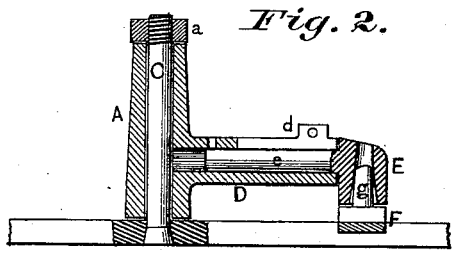
Figure 3:
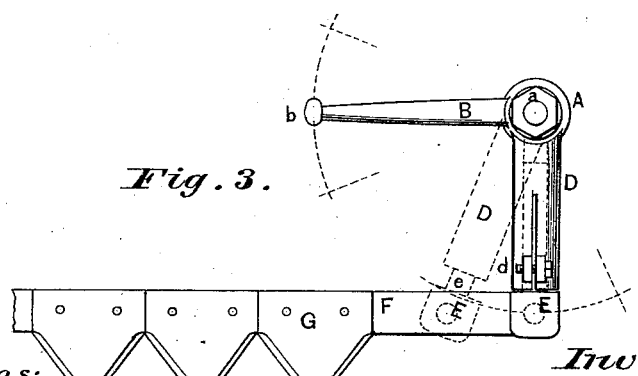

Figure 1 is a perspective view of the rock-shaft, showing its connection with the knife-bar. Fig. 2 shows a sectional view through the body and hollow arm of the rock-shaft, and the secondary arm with the stud upon the knife-bar. Fig. 3 is a plan view of the whole.

Our invention consists of a two-armed rock-shaft, A B D, having its rotary bearing upon the vertical standard C, made secure in the shoe of the machine. One arm of the rock-shaft B has its outer end *b* so fashioned as to constitute, with the pitman from which it derives its motion, a ball-and-socket joint and connection. The other arm, D, which may stand at a right angle with the first, is made hollow for nearly its entire length, and at its outer end is constructed with a kerf or slit, upon either side of which is a lug, and through both of which passes a screw, *d*. Within this hollow arm is a secondary arm, *e*, having the powers both of partial rotation and extension, and the end, without the arm D, fashioned into a square head, with a thimble-shaped opening from the under side, so adapted as to receive a vertical stud, *g*, made secure upon the outer end of the knife-bar F, this stud *g* being of sufficient strength to receive and use the requisite power and motion demanded in the performance of its work.

In practical operation our invention works thus: The ball *b* upon the outer end of the arm B, being in place in the lower end of the pitman of the machine, is caused to vibrate back and forth, and in so doing causes the body A of the rock-shaft to make a partial revolution upon the standard C. This causes a similar vibration of the hollow arm D, carrying with it the secondary arm *e*, which slides within D as in a sleeve. The thimble-shaped opening in the head E of this arm engages with the stud *g* upon the knife-bar F, and thus imparts power and motion to the latter. In the oscillation of the arms D and *e*, the change in the relative distances between the center of rotation of the rock-shaft and the stud *g* is arranged for by the endwise movement of the secondary arm *e* within D. As this repeated motion causes wear, both to the inside of D and upon the outside of *e*, provision is made for taking up this wear by use of the tightening-screw *d*, and the socket in the head of this arm at E, receiving the stud *g*, is made thimble-shaped, to avoid any binding of the stud in its vibration in the finger-bar of the machine.

In those direct-draft machines which have preceded our invention, the lower arm of the rock-shaft has been formed with a square mortise near the outer end, carrying a box engaging the stud upon the knife-bar; but such action was quite unsatisfactory, and attended with great wear of both box and stud, and a rocking motion to the knife-bar, which latter defect is completely obviated in this our improvement, and the wear greatly lessened.

We claim—

The combination of the rock-shaft, the hollow arm of which, D, is provided with the tightening-screw *d*, and the secondary arm *e*, in the outer end of which is a thimble-shaped socket, engaging with a stud, *g*, upon the knife-bar.

HOMER C. MARKHAM.
    D. CLINTON MARKHAM.

Witnesses:
 T. E. WILLIAMS,
 FRED. UPRIGHT.